United States Patent
Shapiro et al.

(10) Patent No.: US 11,443,322 B2
(45) Date of Patent: Sep. 13, 2022

(54) REMOTE PAY MESSAGING SYSTEM AND METHODS THEREOF

(71) Applicant: TRANSACTIONTREE, INC, Atlanta, GA (US)

(72) Inventors: Jason Louis Shapiro, Johns Creek, GA (US); James Christopher Wilson, Cumming, GA (US); Jose Angel Jimenez Dams, Atlanta, GA (US); Mark Theodore Shapiro, Dunwoody, GA (US)

(73) Assignee: TRANSACTIONTREE, INC, Atlanta, GA (US)

( * ) Notice: Subject to any disclaimer, the term of this patent is extended or adjusted under 35 U.S.C. 154(b) by 0 days.

(21) Appl. No.: 17/328,929

(22) Filed: May 24, 2021

(65) Prior Publication Data

US 2021/0365952 A1    Nov. 25, 2021

Related U.S. Application Data

(60) Provisional application No. 63/028,721, filed on May 22, 2020.

(51) Int. Cl.
*G06Q 30/00* (2012.01)
*G06Q 20/40* (2012.01)
*G06Q 20/20* (2012.01)
*G06Q 20/32* (2012.01)

(52) U.S. Cl.
CPC ....... *G06Q 20/4097* (2013.01); *G06Q 20/204* (2013.01); *G06Q 20/3255* (2013.01); *G06Q 20/405* (2013.01)

(58) Field of Classification Search
CPC ................................................. G06Q 20/4097
USPC .... 705/64, 1.1, 35, 44, 39, 75, 26.35, 14.13; 455/456.3, 41.2; 235/379, 380
See application file for complete search history.

(56) References Cited

U.S. PATENT DOCUMENTS

| | | | | |
|---|---|---|---|---|
| 2016/0012465 A1* | 1/2016 | Sharp | ................... | G06Q 20/321 705/14.17 |
| 2016/0019536 A1* | 1/2016 | Ortiz | ..................... | G06Q 20/36 705/67 |
| 2016/0026997 A1* | 1/2016 | Tsui | ................. | G06Q 20/40155 705/44 |

OTHER PUBLICATIONS

ProQuestNPL Search History.*
ProQuestDialogNPL Search History.*

* cited by examiner

*Primary Examiner* — John H. Holly
(74) *Attorney, Agent, or Firm* — Smith Tempel Blaha LLC; Gregory Scott Scott

(57) ABSTRACT

A computer operable method of processing a current transaction between a merchant device and a customer device, including: receiving a command for remote payment from a computer application program on a computer system in a merchant network; receiving said transaction data from the computer application program; said transaction data containing phone number or unique identifiable data element for the customer; generating a message which contains a clickable link; sending a short messaging service (SMS) or multimedia messaging service (MMS) based on the message that is generated; displaying a web page with payment options when link is clicked; directing data transmission to different payment gateways from the payment options displayed on the web page; receiving data from different payment gateways based on the payment option selected; and transmitting said received data from a payment gateway to the originating merchant device.

20 Claims, 11 Drawing Sheets

REMOTE PAY MESSAGING SYSTEM AND METHODS THEREOF

CROSS-REFERENCE TO RELATED APPLICATIONS

This is a utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on May 22, 2020 and assigned Ser. No. 63/028,721, which application is incorporated herein by reference in its entirety.

BACKGROUND

Field of the Invention

The present invention relates to a remote pay messaging system and methods thereof.

Discussion of the Related Art

In a conventional case of paying with a credit card, debit card, or digital wallet at a merchant's physical location, when a customer makes a purchase, the card or device must touch the merchant's terminal. This interaction can lead to a transfer of substances such as viruses or bacteria.

In a conventional case of purchasing online, when a customer makes a purchase, the customer completes payment on their own device.

In a conventional case of purchasing from a merchant over the phone, the customer provides the merchant with their payment information and the merchant manually inputs this information. This interaction can lead to security and Payment Card Industry ("PCI") issues related to recording the payment card number, personal identification number ("PIN") etc.

In a conventional case of purchasing from a food service merchant, the customer provides the merchant employee with a payment card and the employee takes the payment card to a physical terminal to complete the payment process. This interaction can lead to health and security risk.

In a conventional case of a customer picking up an order without entering a merchant's physical location, the customer provides the merchant employee with a payment card and the employee takes the payment card to a physical terminal to complete the payment process. This interaction can lead to health and security risk.

In the related art, when a customer receives a request for payment through short messaging service (SMS) utility, the customer replies with an approval code. This code authorizes the merchant to use a payment card that is stored or on file with the merchant. If a customer does not have a payment card stored with the merchant on a merchant system, then the customer cannot pay using short messaging service (SMS).

In the related art, a customer can submit a payment on their own device to a website or app using a digital wallet. The purchase payment has to be completed on the originating system from which the purchase started.

There is a need for improved systems that avoids the security risk of receiving a customer's payment information over the phone, the health concerns of contaminating payment cards or mobile devices with a pathogen, and enables the purchaser to have an auditable direct communication channel with a merchant location.

BRIEF SUMMARY

The various embodiments of the present invention address the above-identified needs in the art, as well as other needs by providing a remote payment system to facilitate fulfillment of a transaction between a customer and a merchant in a secured manner.

Accordingly, the various embodiments of the present invention are directed to remote pay messaging systems and methods thereof that substantially obviate one or more of the above-identified problems in the art, as well as other problems and issues, due to limitations and disadvantages of the related art.

An exemplary embodiment of the remote payment system includes a network based system, and a method for authorizing the fulfillment of a transaction. The network based system includes, among other elements, a computer program running on a merchant device that is associated with a particular entity, a communication device associated with a particular entity, a fulfillment system, and a transaction processing system.

The transaction processing system is configured to interface to the merchant device, the computer program running on the merchant device, the communication device and the fulfillment system over one or more networks and perform, facilitate on invoke the authorization of the transaction fulfillment. For instance, the transaction processing system may include a transaction program in a non-transitory medium and a processor, and in response to the processor executing the transaction program, the transaction processing system causes the transaction to be fulfilled.

Initially, the transaction processing system receives a transaction initiation as the result of the computer program being actuated by the particular entity. In some embodiments, the merchant device is a point-of sale system and the computer program is actuated by an entity interfacing with the point-of-sale system. In other embodiments, the merchant device can be a kiosk, an online store, etc.

The transaction processing system then obtains transaction processing data from an information source. The transaction processing data uniquely identifies the particular entity, the particular merchant and one or more parameters pertaining to the transaction. In some embodiments, the information source may include the communication device for receiving information about the entity, or a user profile accessible to the merchant device. Further, the information source may also include a datastore communicatively coupled to the merchant device and includes information to identify the particular merchant and one or more parameters pertaining to the transaction.

The transaction processing system then utilizes the transaction processing data to formulate an electronic message. The electronic message may take one of several forms, including SMS or MIMS, and includes an actionable element that is associated with the particular entity and the transaction. The transaction processing system then provides the electronic message to the communication device associated with the particular entity. In some embodiments, the communication device associated with the particular entity can be a mobile device, such as a mobile telephone, smart phone, etc. that provisioned with a network telephone number (i.e., includes a SIM card or some other telephone number, virtual number, etc.) and the transaction processing system is configured to provide the electronic message to the communication device by sending the electronic message through a communications network directed to the network telephone number.

Next, the transaction processing system detects an actuation of the actionable element within the electronic message. In some embodiments, the transaction processing system is configured to detect the actuation of the actionable element by receiving a response electronic message from the communication device transmitted in response to the entity actuating the actionable element.

In response to detecting the actuation of the actionable element, the transaction processing system provides further information to the communication device to identify the particular merchant, the transaction and one or more options for fulfillment of the transaction. In some embodiments, the transaction processing system is configure to provide further information to the communication device by providing one or more payment options.

The transaction processing system then receives an option selection from the particular entity utilizing the communication device. In some embodiments, the transaction processing system is configured to receive an option selection from the particular entity by receiving an electronic message that identifies a selected payment option and information necessary to perform the selected payment option.

Upon receipt of the option selection, the transaction processing system transmits the option selection over a network to the fulfillment system. The transaction processing information includes sufficient information for the fulfillment system to fulfill the transaction. In some embodiments, the transaction processing system is configured to transmit the option selection over a network to the fulfillment system by sending a payment request to the fulfillment system, the payment request including a dollar amount, the identity of the particular merchant and payment authorization information.

The transaction processing system then receives over the network, an approval of the fulfillment of the transaction from the fulfillment system. In some embodiments, the fulfillment system is configured to access an account associated with the particular entity to extract funds in the dollar amount and provide the extracted funds to an account associated with the particular merchant.

At this point, the transaction processing system then provides an indication to the communication device and the computer program associated that the approval for the fulfillment of the transaction has been received. In some embodiments, the computer application is configured to provide a visual indication on the point-of-sale system that the purchase has been fulfilled.

An advantage of the various embodiments of the present invention is to provide remote pay messaging systems and methods capable of reducing the physical contact at the point of purchase.

Another advantage of the various embodiments of the present invention is to provide a remote pay messaging system and methods capable of sending a link to a customer's device through short messaging service (SMS) or multimedia messaging service (MMS) to any digital output from a physical or virtual terminal.

Yet another advantage of the various embodiments of the present invention is to provide remote pay messaging systems and methods that allow a customer to send and receive short messaging service (SMS) or multimedia messaging service (MMS) messages directly with a merchant's location using the local telephone number of the location, a dedicated messaging telephone number for the location, or a dedicated messaging telephone number for the merchant.

Yet another advantage of the various embodiments of the present invention is to provide remote pay messaging systems and methods that enable a customer to complete the purchase of goods or services through their own digital device.

Yet another advantage of the present invention is to provide remote pay messaging system and methods that allows any customer device with short messaging service (SMS) and web browser the ability to complete the payment process on this device.

Additional features and advantages of the various embodiments of the present invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a computer operable method, including: receiving a command to obtain payment approval from a computer application program on a computer system; receiving said data from the computer application program, the data including a plurality of categories of information necessary to obtain payment approval; obtaining a phone number of the customer from a customer information database associated with the computer system; providing an option to input a phone number, change a phone number, or use a phone number from the computer application program; receiving a user selection of a least one of the options from an input device of the computer system; checking for phone number validity; if the phone number is not correct, obtaining a corrected phone number; transmitting the data to a server in communication with one or more computer systems, including generating data and transmitting data to the server, wherein the data includes the information necessary to obtain payment approval and the correct phone number of the customer; selecting a template based on the data transmitted to the server; and sending a short messaging service (SMS) or multimedia messaging service (MMS) to the correct phone number of the customer according to the selected template.

In another aspect of the present invention, a computer-readable medium having computer readable instructions stored thereon for execution by a processor to perform a method includes: receiving a command to obtain payment approval from a computer application program on a computer system; obtaining a phone number of the customer; providing an option for a customer to pay for the transaction on their mobile device or use the physical payment process; obtaining a selection of at least one of the provided options; if the option to pay for the transaction on their mobile device is selected, initiating sending short messaging service (SMS) or multimedia messaging service (MMS) using data obtained from the computer system and a phone number; and if the option to use the physical payment process is selected, initiating sending the transaction data through the traditional payment process.

In yet another aspect of the present invention, a remote pay messaging system, includes: an application on a computer system, the application receiving data needed to obtain payment approval for a purchase, and transmitting the data; one or more servers receiving the transmitted data and sending an short messaging service (SMS) or multimedia messaging service (MMS) the received data to a phone number of the customer; the server obtaining data from a payment system that authorizes the payment; the server transmitting the authorization data to the application on a computer system.

In yet another aspect of the present invention, a remote pay messaging system, includes: an application on a computer system, the application transmitting data needed to obtain payment approval for a purchase; one or more servers receiving the transmitted data and sending an short messaging service (SMS) or multimedia messaging service (MMS) the received data to a phone number; the server obtaining data from a payment system that authorizes the payment; the server transmitting the authorization data to the application on a computer system.

In yet another aspect of the present invention, a remote pay messaging system, includes: obtaining text and meta data from a mobile device; linking data from a mobile device to a customer database and transaction data; providing the ability for a computer system user to receive and send messages from a customer; providing the ability for a computer system user to use linked data in the an short messaging service (SMS) or multimedia messaging service (MMS) that is sent to a phone number; and the ability to view all messaging with a customer over a time period.

It is to be understood that both the fore going general description and the following detailed description are exemplary and explanatory and are intended to provide further explanation of the invention as claimed.

BRIEF DESCRIPTION OF THE SEVERAL VIEWS OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF EMBODIMENTS

Figure 1:
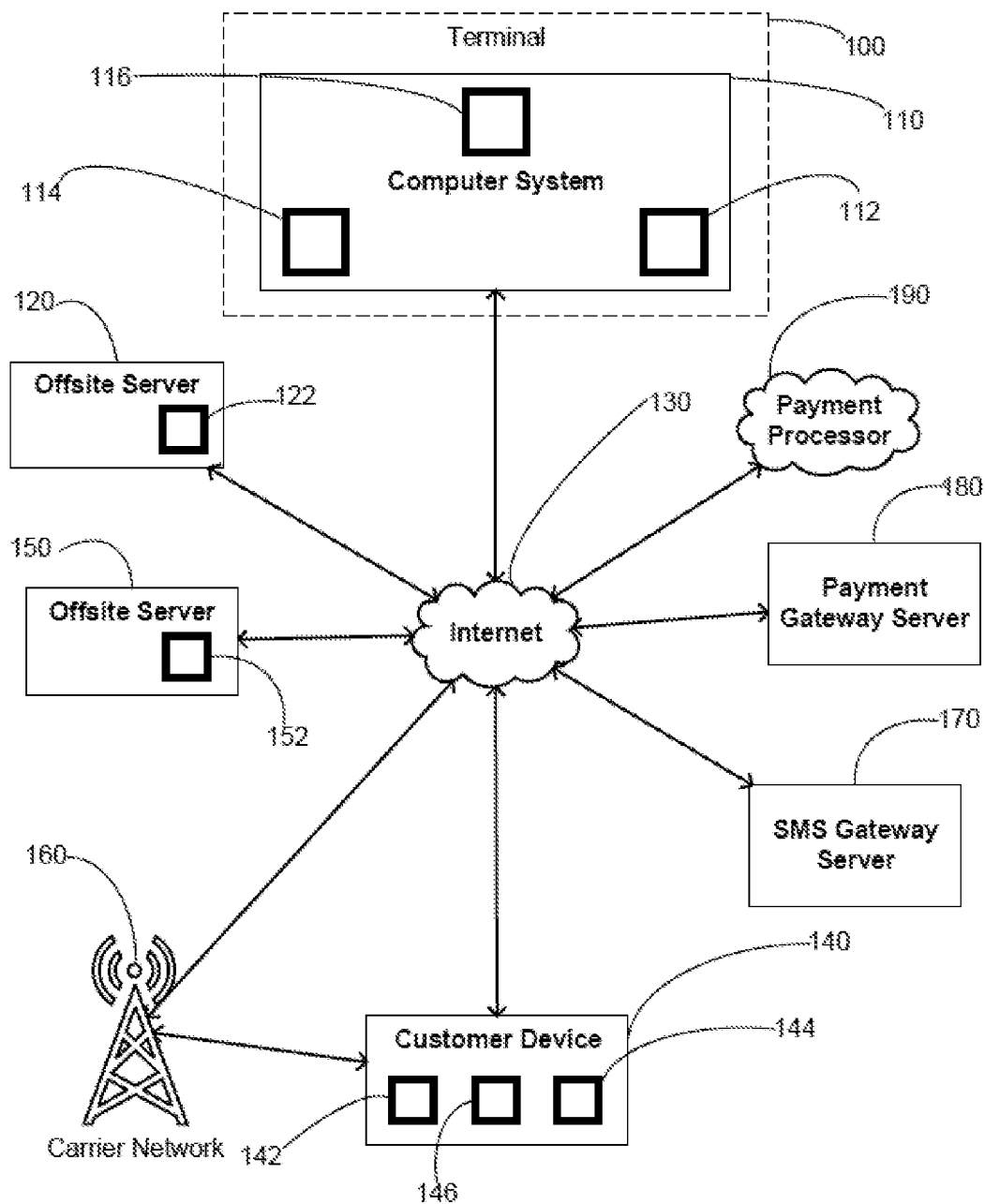
FIG. 1 illustrates an environment suitable for implementation of an exemplary embodiment of the Remote Payment System.

The present invention, a remote payment system and method, as well as features and aspects thereof, is directed towards providing a secure and health compliant system and method for the acceptance, processing and validation of remote payments.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

Reference will now be made in detail to embodiments of the present invention, examples of which is illustrated in the accompanying drawings.

The various embodiments of the invention, whether embodied in a system or method, will be referred to herein as a remote payment system. The remote payment system may be implemented in a computer system, a computer server, a distributed system, multi-platform systems, portable devices, etc. Further various embodiments may also be implemented in software or firmware, such as code stored within a non-transitory medium such as computer disks, hard drives, RAM, ROM, EPROM, etc. Even further, various embodiments of the system can be implemented by using discrete hardware components, digital devices, PGA, etc. Even further, it should be understood that any combination of any of the afore-mentioned embodiments may be used together to implement various embodiments. As such, any particular embodiment of the remote payment system, even if embodied on a standard off-the-shelf computer system, once the embodiment of the remote payment system is integrated therein, the newly implemented system is a customized computer system that implements the various features and aspects of the remote payment system.

The remote payment system, in general allows and enables merchants and users/entities who/that utilize computer systems, such as point of sale (POS) terminals, order management systems (OMS), cash registers, ecommerce systems, or payment terminals, as non-limiting examples, the ability to use data from these systems and send a short messaging service (SMS), multimedia messaging service (MMS), or other electronic message to customers, so customers can complete the payment for a purchase on their own device.

As a non-limiting example, an application may embody the remote payment system. In such an embodiment, the application is installed on the operating system (OS) level or internet browser level or app level or keyboard level of a computer system, such as the point of sale (POS) terminal, order management systems (OMS), cash register, ecommerce systems, or payment terminals, etc. The term computer system, as used throughout this description, should be construed to include desktop computers, laptop computers, tablets, mobile devices, servers, point of sale terminals, printers, drones, vending machines, etc. As such, the term computer system will collectively refer to each and any computing platform for the sake of brevity. Non-limiting examples of operating systems include Windows, Linux, macOS, Unix, Android, iOS, Chrome OS, tvOS, .net based OS, java based OS, web based OS, a virtual OS, and 4690. The various embodiments of the application may run on any computer system that is connected, or able to be coupled, to a network either continuously or periodically.

The application allows users to complete a purchase that originated from a computer system through the users own network enabled device. The user device can be a desktop, laptop, tablet, mobile device, wallet, or body-centric device as non-limiting examples. These devices have an operating system, such as, Windows, Linux, macOS, Unix, Android, iOS, Chrome OS, tvOS, .net based OS, java based OS, web based OS, a virtual OS, and 4690 as non-limiting examples. However, it should be appreciated that embodiments of the invention may be implemented on any platform, whether it be a commercial platform with commercially available software or a custom system and/or custom operating system.

When a user, customer, or application request to tender or payment, the user, customer, or application may choose remote pay. In the remainder of the description, the terms user, customer and application may be used interchangeably to refer to certain tasks or actions being initiated.

If remote pay is selected, the application captures the required data to authorize the payment. The application may ask for either a telephone number, personally identifiable information (PIN), biometric or facial scan such as for existing users, voice recognition, etc. The data is then associated with the customer data.

Alternatively, the application may capture the customer data before the remote pay option is engaged.

Alternatively, for such as for existing users, remote pay is the default tender or payment selection, and no additional options are provided.

Alternatively, remote pay may be the only available method to complete a payment from a computer system.

This data is then transmitted electronically to the user, customer, or application network enabled device.

The user, customer, or application then clicks on a secure link that was generated by the application that is unique to the merchant and the current transaction. The user, customer, or application then completes the payment on their own device.

Alternatively, the secure link is not a secure link.

Alternatively, the secure link is text or an image.

The application then transmits the payment request to a gateway, processor, card issuer, or native payment application on the user, customer, or application's device.

The application receives a response from the payment request source and transmits the response to the originating user, customer, or application and to the originating computer system.

Alternatively, the application may verify, approve, or decline a payment through short messaging service (SMS), multimedia messaging service (MMS), email or other electronic messaging technique using a traditional payment method, such as a payment card. A user, customer, or application receives a message on the device being used in the transaction and then responds to the message. The response to the message determines the verification, approval, or disapproval of the payment.

A user, customer, or application may respond to a short messaging service (SMS), multimedia messaging service (MMS) or other electronic message received from the application. The application directs the received message to a user, customer, or application based on the telephone number or unique id to which the short messaging service (SMS), multimedia messaging service (MMS) or electronic message was sent.

Figure 2:
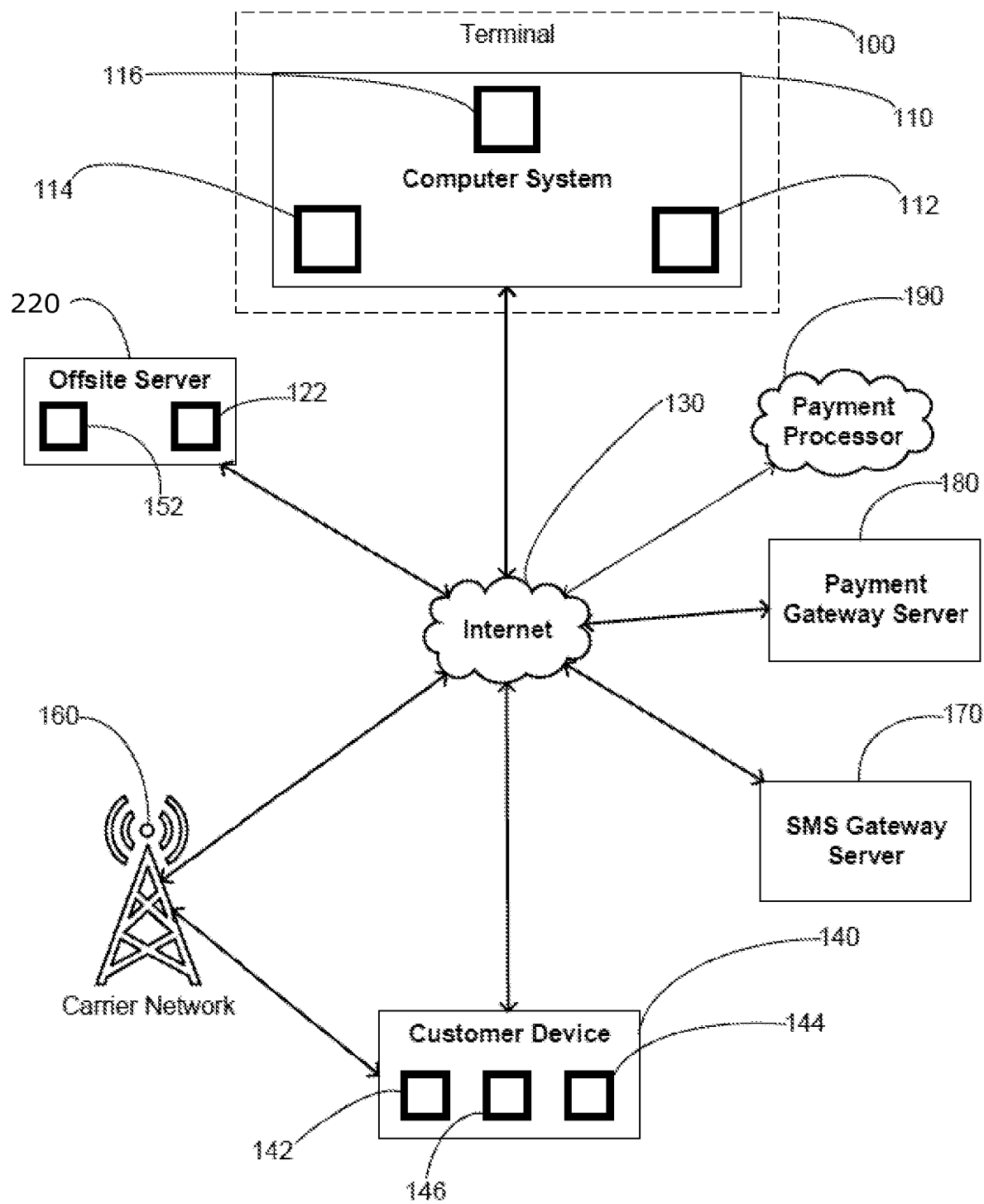
FIG. 2 illustrates another environment suitable for implementation of an exemplary embodiment of the Remote Payment System.
Figure 3:
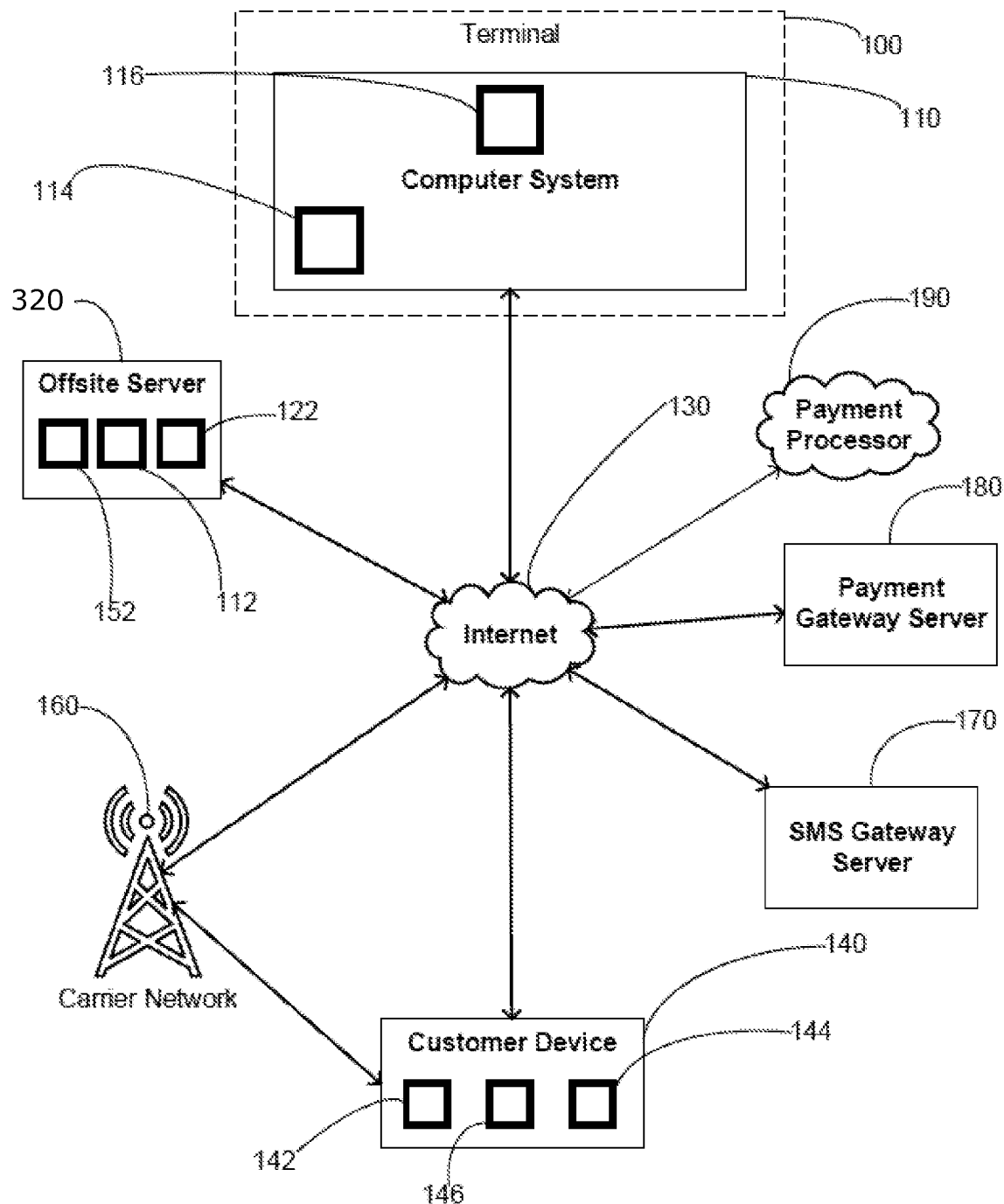
FIG. 3 illustrates yet another environment suitable for implementation of an exemplary embodiment of the Remote Payment System.

FIGS. 1, 2, and 3 are directed to a first, second, and third illustrated embodiment of the present invention.

These embodiments illustrate one or more server(s) connected to the internet or network and being in a different location than the computer system(s) where the payment application is installed, such as a terminal location. It should be appreciated, as those skilled in the art will be familiar, that the term server is a piece of computer hardware or software (computer program) that provides functionality for other programs or devices, called "clients". This architecture is called the client-server model. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, and application servers.

Client-server systems are today most frequently implemented by (and often identified with) the request-response model: a client sends a request to the server, which performs some action and sends a response back to the client, typically with a result or acknowledgment. Designating a computer as "server-class hardware" implies that it is specialized for running servers on it. This often implies that it is more powerful and reliable than standard personal computers, but alternatively, large computing clusters may be composed of many relatively simple, replaceable server components. The components that make up a server may be a single computer at a single location, multiple computers at a single location, multiple computers geographically disbursed or distributed and connected to each other through a network or any combination of these. In the various embodiments illustrated, the server(s) can run one or more of various operating systems, such as Windows, Linux, macOS, Unix, Android, iOS, Chrome OS, tvOS, .net based OS, java based OS, web based OS, a virtual OS, or 4690 as non-limiting examples. This server(s) take the data received from the network or internet from other computer system(s) and react to such data.

It will be appreciated that the embodiments illustrated in FIGS. 1, 2 and 3 have several similar components and some variations. As such, the components that are common throughout the views will be indicated with like labels.

FIG. 1 illustrates an environment suitable for implementation of an exemplary embodiment of the Remote Payment System. The illustrated embodiment includes multiple servers, systems and components connected to a wide-area network 130, such as the Internet. A terminal location 100 is illustrated as including a computer system 110 housing an installation of a payment application 112 and a database that contains at least one unique identifiable data element (UIDE) 114. The computer system 110 can be running an operating system such as Windows, Linux, macOS, Unix, Android, iOS, Chrome OS, tvOS, .net based OS, java based OS, web based OS, a virtual OS, or 4690 as non-limiting examples. The application 112 can be install onto the computer system 110 from a network connection, USB, CD, disk, desk format, or an application marketplace (such as the AppStore, Google Apps, etc.) as a few non-limiting examples. After the application 112 is installed it may automatically be set to a default state or the user or customer can configure the application when it is first launch or reconfigure it whenever it is used.

When the user or customer wants to tender, submit a payment, or conduct some other transaction, the user engages the application 112 such as by launching the application 112, logging in, etc. The application 112 captures the required data from the computer system 110 to perform any requested operations.

If the user or customer selects the option for remote pay, they may be prompted or requested to input identification information, such as a telephone number or personally identifiable information (PIN). The identifying data is then associated with the required data. All data is then transmitted across the network 130 to an offsite server 120.

The offsite server 120 is illustrated as including the remote pay application 122 installed within the offsite server 120. The remote pay application 122 receives and processes the required data from application 112 and may generate a link, such as a unique clickable URL link and a visual indicia, such as an icon or a Corresponding web browser viewable page. The remote pay application 122 then transmits the data and unique clickable URL to offsite server 150. The transmission of the unique clickable URL may be accomplished over a local area network (LAN) (not shown), wide area network (WAN) (not shown), or the internet 130 as illustrated.

Offsite server 150 is illustrated as including a messaging application 152. The messaging application 152 generates a message containing data received from the remote pay application 122. The message that is generated by messaging application 152 can be from a template or may simply include the data that was received from the remote pay application 122. The messaging application 152 determines what type of electronic messaging to use, such as short messaging service (SMS) or multimedia messaging service (MMS) as non-limiting examples. The messaging application 152 then transmits the message and data, which contains the unique id of the originating user, customer, or application (UIDE) and a unique id of the receiving user, customer, or application, to the SMS gateway server 170. Transmission may be accomplished over a local area network (LAN) (not shown), wide area network (WAN), or internet 130.

The SMS gateway server 170 then transmits the message received from the messaging application 152 to a user, customer, or application device using the unique id to the carrier network 160. Transmission may be accomplished over a local area network (LAN) (not shown), wide area network (WAN), or internet 130.

The carrier network 160 then transmits the message to a customer device 140. The carrier network 160 may the proprietary network infrastructure belonging to a telecommunication serve provider, such as a mobile telephone network, but may also incorporate other network infrastructure such as the PSTN etc. The message is received by a messaging application 142 that is running on the customer device 140.

The user, customer, or application receives the message on customer device 140. The message may contain hypertext markup language (HTML), cascading style sheet (CSS), text, images, URL links, or a combination of two or more of these as well as well as other elements. A user, customer, or application may then complete the purchase that originated on computer system 110 using the message received on customer device 140.

A user, customer, or application will view the message in a messaging application 142. If the user, customer, or application actuates an actionable element (such as clicking a link or URL) that is within the message, a web viewing application 144 will be opened or accessed on the customer device 140. The web viewing application 144 will display a web viewable page from offsite server 120 with payment options. The user, customer, or application may then select at least one payment option.

Depending on the payment option selected by a user, customer, or application on the web viewable page displayed on the customer device 140, different payment processing mechanisms may be utilized. For example, the user, customer, or application may select an option which utilizes a payment gateway server 180. If the user, customer, or application selects this option, the payment gateway server 180 may operate by sending data to a payment a processor 190. Transmission may be accomplished over a local area network (LAN) (not shown), a wide area network (WAN), or the internet 130. The payment processor 190 may then transmit data to the payment gateway server 180. The payment gateway server 180, upon receipt of the data, may then transmit the data to the remote payment application 122 over the internet 130. Depending on the data received by remote pay application 122, the web viewable page on the customer device 140 may change.

The user, customer, or application may select an option which utilizes a digital wallet application 146 that is installed on the customer device 140. If the user, customer, or application selects to use the digital wallet application 146, the digital wallet application will be engaged on the customer device 140. Data is then transmitted from the digital wallet application 146 to the remote payment application 122 over the internet 130. The remote payment application 122 responds by transmitting the data over the internet 130 to the payment processor 190. The payment processor 190 transmits data back to the remote pay application 122. Depending on the data received by remote pay application 122, the web viewable page on the customer device 140 may be changed.

The remote pay application 122 then transmits the data received from payment gateway server 180 to the computer system 110 from which the starting data originated.

It should be appreciated that a wide variety of payment options may be available in the various embodiments of the remote payment system. In addition to those mentioned, other non-limiting examples may include PAYPAL, VENMO, ZELLE, APPLE PAY, SAMSUNG PAY, DWOLLA, STRIPE, DUE, PAYONEER, 2CHECKOUT, AMAZON PAYMENTS, SQUARE, PAYZA, SKRILL, WEPAY, INTUIT GOPAYMENT, and AUTHORIZE.NET. In addition, the customer device may be equipped with various banking apps that may also enable payment options directly from the customers banking account. Even further, the user may enter other payment options such as entering credit card information, debit card information, gift card information, either on the key board or key pad or by scanning an insignia, such as a bar code or QR code on the card or associated with an account of the customer.

The various embodiments of the remote pay system may be implemented in different configurations and the illustrated configurations should not be construed to limit the scope of the present invention.

A first embodiment presented in FIG. 1, is configured as follows:

Offsite server 120 and offsite server 150.

The offsite server 120 runs a version of the remote pay application 122 software.

This offsite server 120 then takes the data received from the payment application 112 via the internet 130 and transmits the data to offsite server 150.

This offsite server 150 runs a version of the messaging application 152 software.

This offsite server 150 then takes the data received from the remote pay application 122 and transmits the data over the internet 130 to the SMS gateway server 170.

The remote pay application 122 and messaging application 152 can be installed on their own server (i.e. offsite server 120 and offsite server 150 respectively) or share a sever with each other as well as one or more other applications.

FIG. 2 illustrates another environment suitable for implementation of an exemplary embodiment of the Remote Payment System. This embodiment presented in FIG. 2 is configured as follows:

Remote pay application 122 and messaging application 152 installed on a single offsite server 220.

The offsite server 220 receives data from the payment application 112 over the internet 130. The remote pay application 122 transmits and receives data with the messaging application 152 over a local area network (LAN) or through an application interface.

FIG. 3 illustrates yet another environment suitable for implementation of an exemplary embodiment of the Remote Payment System. The third embodiment presented in FIG. 3 is configured as follows:

Remote payment application 112, remote pay application 122, and the message application 152 are installed on a single offsite server 320.

The offsite server 320 runs a version of the payment application 112, remote pay application 122, and message application 152.

The computer system 110 access the payment application 112 over the internet 130. The payment application 112, remote pay application 122, and message application 152 transmit data to each other over local area network (LAN), through application calls or interfaces, etc.

Figure 4:
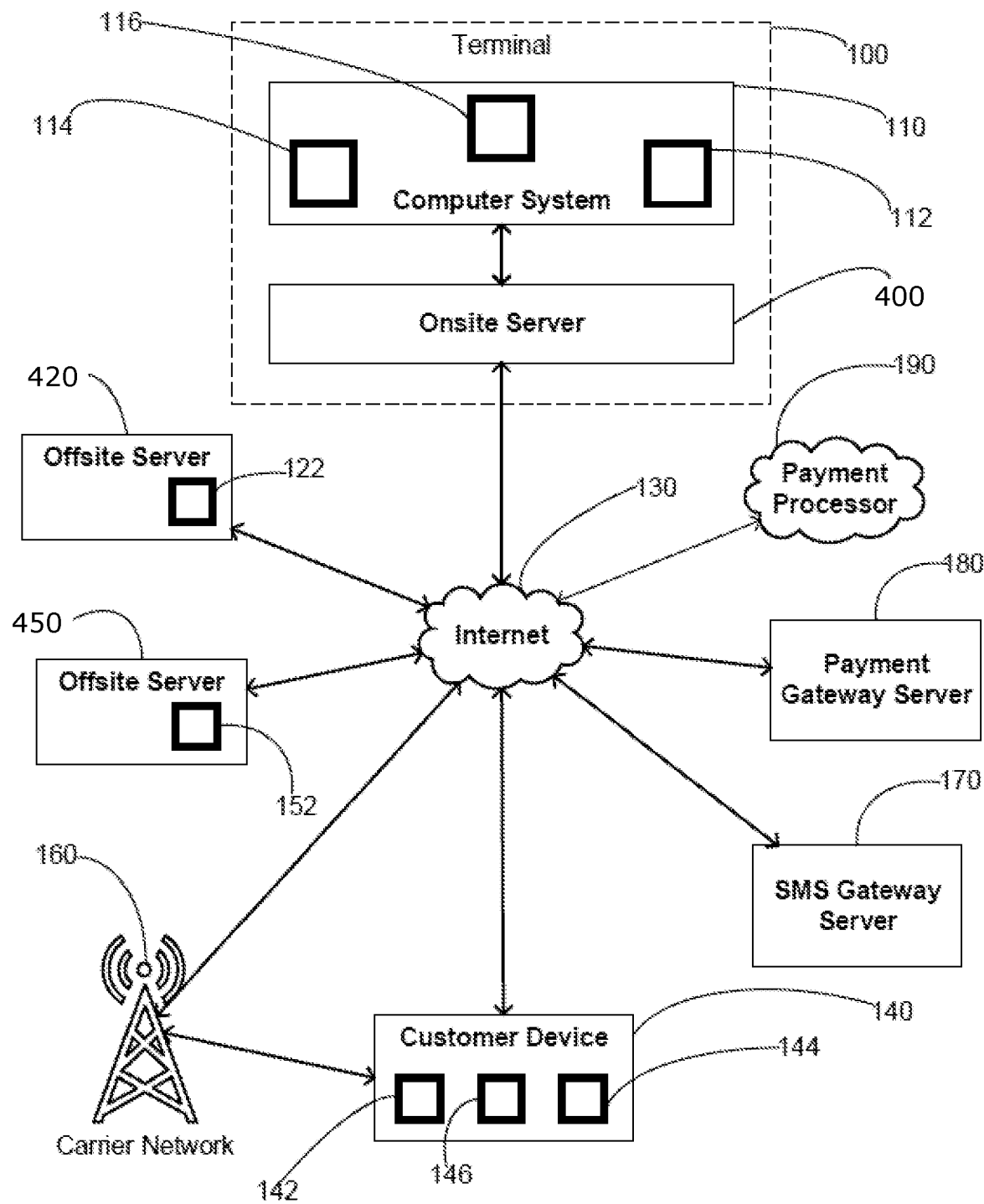
FIG. 4 illustrates an exemplary environment for another embodiment of the remote payment system.
Figure 5:
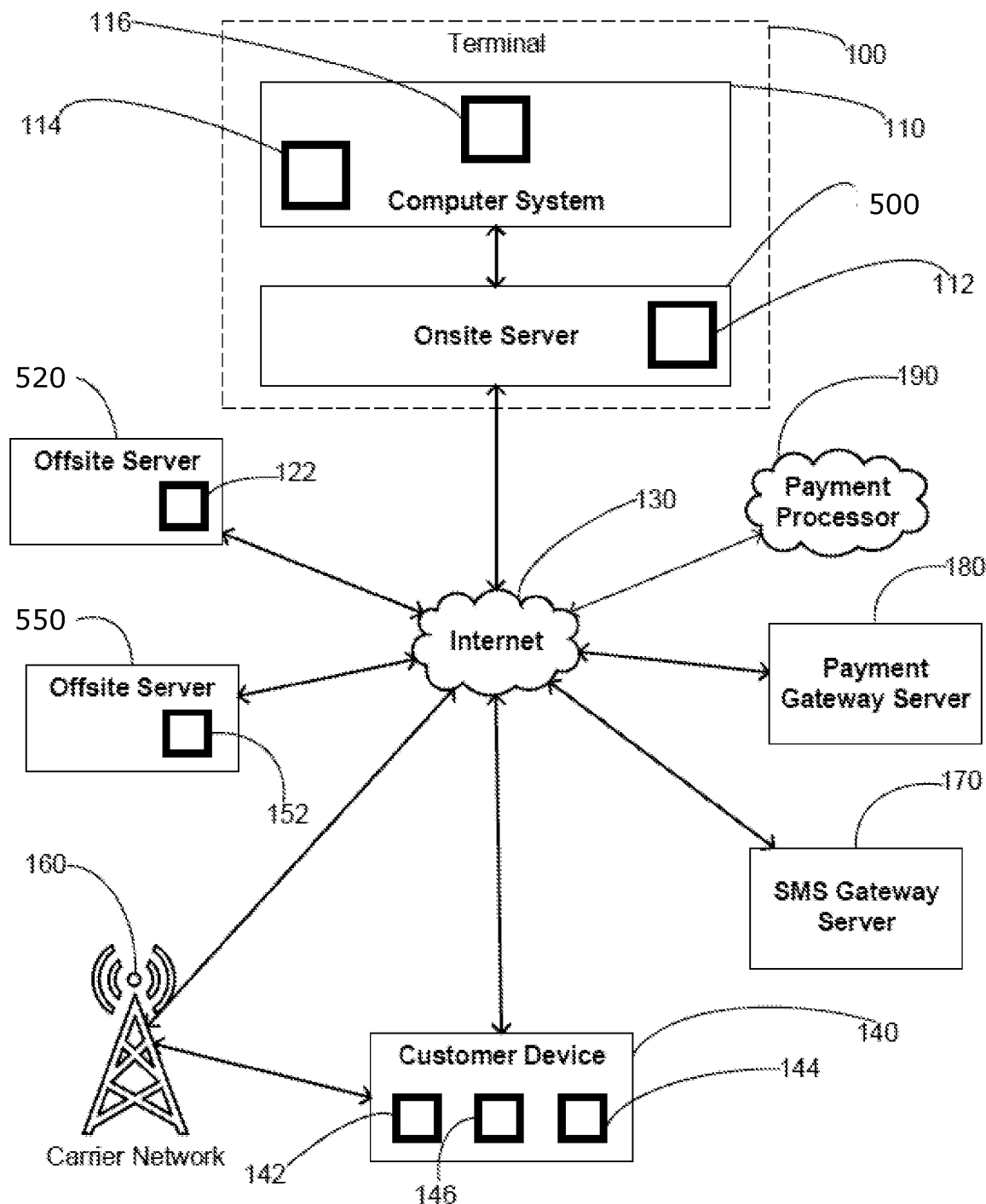
FIG. 5 illustrates an exemplary environment for another embodiment of the remote payment system.
Figure 6:
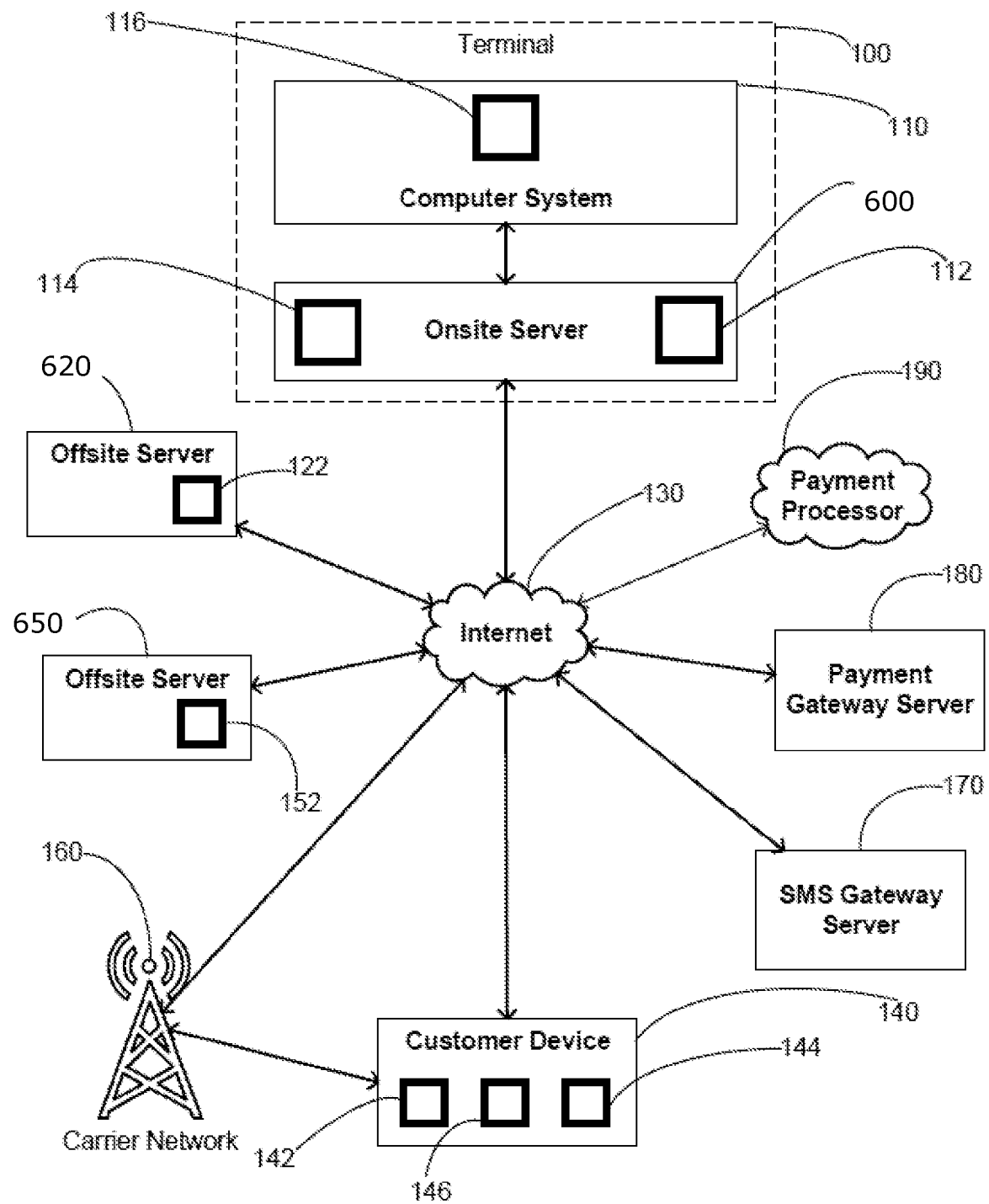
FIG. 6 illustrates an exemplary environment for another embodiment of the remote payment system.

FIGS. 4, 5, and 6 are directed to additional embodiments of the remote payment system.

Each of the embodiments or configurations presented in FIGS. 4, 5 and 6 utilize one or more server hosted offsite, such as by a third party, and one or more onsite server.

Offsite is defined as a server not being on the same local network as terminal 100. Onsite is defined as a server being on the same local or wide area network as terminal 100, or otherwise interfacing with the terminal 100. Onsite or offsite servers can be running operating systems such as Windows, Linux, macOS, Unix, Android, iOS, Chrome OS, tvOS, .net based OS, java based OS, web based OS, a virtual OS, or 4690 s non-limiting examples.

FIG. 4 illustrates an exemplary environment for another embodiment of the remote payment system. The illustrated embodiment is configured as follows:

Offsite server 420, offsite server 450, and onsite server 400

The offsite server 420 runs a version of the remote pay application 122 software.

The offsite server 420 then takes the data received from the payment application 112 via the internet 130 and transmits the data over a local area network (LAN), wide area network (WAN), or internet 130 to the offsite server 450.

The offsite server 450 runs a version of the messaging application 152 software.

The offsite server 450 then takes the data received from the remote pay application 122 and transmits the data over the internet 130 to the SMS gateway server(s) 170.

The onsite server 400 receives data from and sends data to computer system 110. The onsite server 400 also sends and receives data from the internet 130.

The remote pay application 122 and messaging application 152 can be installed on their own server(s) or share a sever with one or more other applications.

FIG. 5 illustrates an exemplary environment for another embodiment of the remote payment system. The illustrated embodiment is configures as follows:

Offsite server 520, offsite server 550, onsite server 500.

The offsite server 520 runs a version of the remote pay application 122 software.

This offsite server 520 then takes the data received from the payment application 112 via the internet 130 and transmits the data over local area network (LAN), wide area network (WAN), or internet 130 to offsite server 550.

The offsite server 550 runs a version of the messaging application 150 software.

The offsite server 550 then takes the data received from the remote pay application 122 and transmits the data over the internet 130 to the SMS gateway server(s) 170.

The onsite server 500 runs a version of a payment application 112.

The payment application 112 receives data from the computer system 110 over local area network (LAN), wide area network (WAN) or some other form of connection.

The remote pay application 122 and messaging application 152 can be installed on their own servers or share a sever with one or more other applications.

FIG. 6 illustrates an exemplary environment for another embodiment of the remote payment system. The illustrated embodiment is configures as follows:

Offsite server 620, offsite server 650, onsite server 600.6.

The offsite server 620 runs a version of the remote pay application 122 software.

This offsite server 620 then takes the data received from the payment application 112 via the internet 130 and transmits the data over local area network (LAN), wide area network (WAN), or internet 130 to offsite server 150.

The offsite server 650 runs a version of the messaging application 650 software.

The offsite server 650 then takes the data received from the remote pay application 122 and transmits the data over the internet 130 to the SMS gateway server 170.

The onsite server 600 runs a version of a payment application 112 and an application or database 114 that contains at least one unique identifiable data element (UIDE).

The payment application 112 receives data from the computer system 110 over local area network (LAN), wide area network (WAN) or some other form of connection.

The remote pay application 122 and messaging application 152 can be installed on their own server or share a sever with one or more additional applications.

Figure 7:
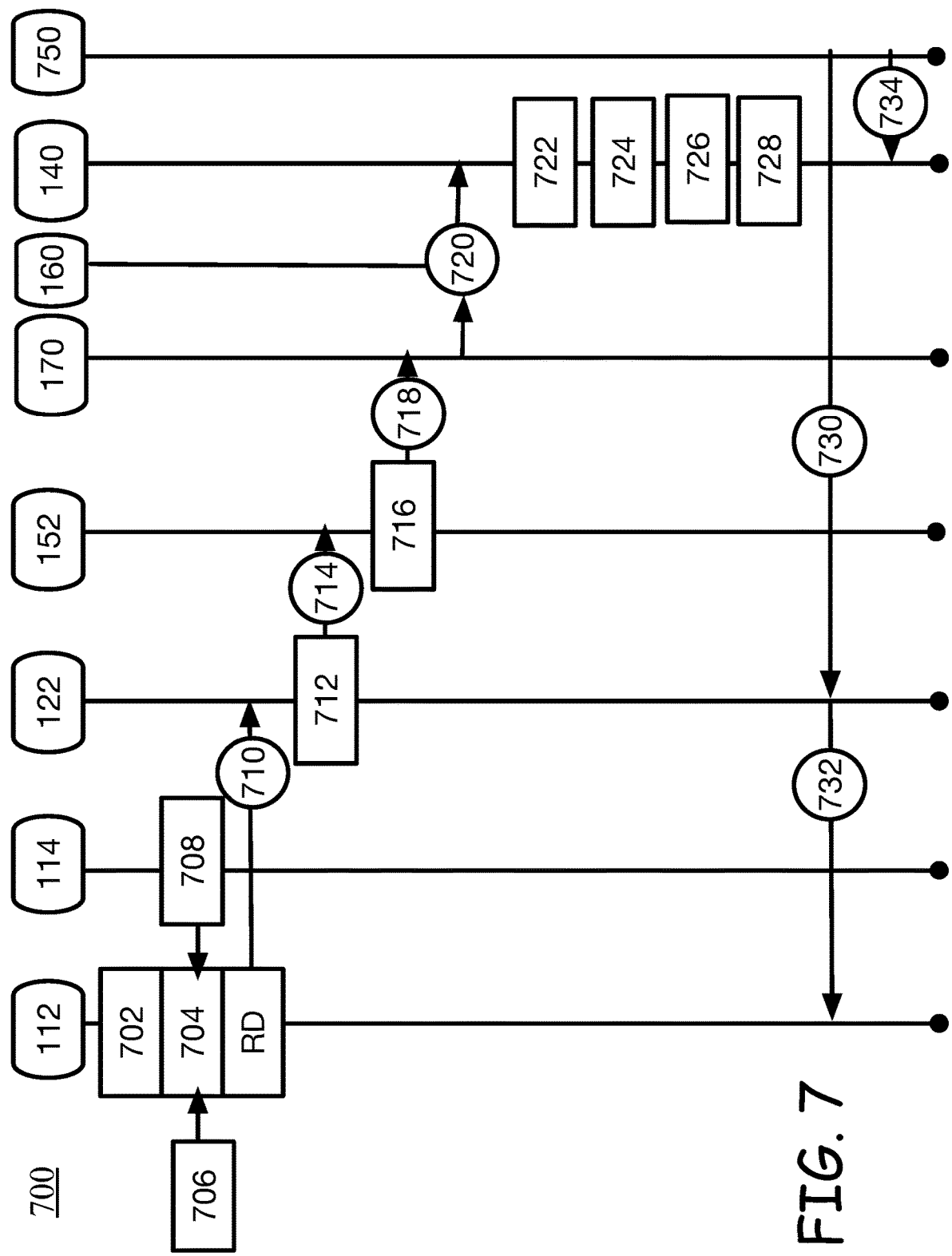
FIG. 7 is a remote pay process communication flow diagram illustrating exemplary actions of an exemplary embodiment of the remote payment system.

FIG. 7 is a remote pay process communication flow diagram illustrating exemplary actions of an exemplary embodiment of the remote payment system. The actions of the remote payment system 700 illustrated in FIG. 7 are the general actions that can be performed in any of the embodiments described herein as well as variants thereof. Some of the actions are described as being performed by various applications, which as presented above, may reside in different components, computers, systems, servers, etc., depending on the particular architecture of the environment in which the remote pay system is implemented or deployed.

In the illustrated communication flow diagram, a transaction is initiated utilizing the payment application 112, which may be embodied within a point of sale (POS) terminal, kiosk, cash register, table top payment system, vending machine, online store, gas pump, etc. The various above-described embodiments commonly refer to this as the computer system 110 and terminal 100.

It should be appreciated that the term transaction is used to describe a wide variety of actions. A few non-limiting examples of actions may include purchases, sales, paying rental fees, making a deposit, electronically signing a document, purchasing stock or crypto-currency, exchanging currency, etc.

The payment application 112 is communicatively coupled to database 114. Among other things, the database 114 contains one or more unique identifiable data elements (UIDE). The UIDE is utilized to identify the source of the transaction. As such, the UIDE may identify the terminal 100 or computer system 110 utilized to conduct the transaction, the merchant, the location, etc.

When a transaction (i.e., tender, payment, deposit, etc.) is initiated using the payment application 112, the user engages the application 112, such as by launching the application 112, logging in, providing information to identify the user that is requesting the transaction, etc. 702. In some embodiments, the user may simply approach the computer system 110 or terminal 100, which may already be in the up and ready state with the payment application 112 ready to receive action requests. For instance, a self-check-out terminal in a store.

Once the user has gained access to the functionality of the payment application 112, the user is presented with a user interface for selecting one or more of the operations or functions offered by the payment application 112. The user then selects to perform a transaction 704 using the terminal 100. Once the user selects the transaction option, the user may be prompted or requested to input identification information 706, such as a telephone number or personally identifiable information (PIN). In some embodiments, this information may be required prior to the user selecting the transaction option. This information may be provided in a variety of manners. A few non-limiting examples may include keying the information into the terminal 100, scanning a bar code or QR code, reading a signal from the user's mobile device, using a bio-measurement device such as a finger print reader or facial recognition, etc. As a practical and non-limiting example, if the payment application 112 is running on a point-of-sale terminal in a store, the user may simply touch the screen and then be prompted to scan items to purchase. Once the user is completed, the user can select the payment option for finalizing the purchase. Typically, a user is offered options such as cash, credit card, debit card, gift card, etc. In this non-limiting example, the user may also be presented with a remote pay option that triggers the further events for finalizing the purchase with remote payment.

The payment application 112 captures the user identification information 706 from the user, as well as other information 708 from the database 114, such as the UIDE, etc. It should be appreciated that the database 114 may be local or distributed, and in addition, the other information 708 can be obtained from other sources other than the database 114. The user provided identifying data 706 is then associated with the database 114 information 708 and the combined set of information is referred to as the required data (RD). The required data (RD) comprises the set of data that is necessary to identify the requested action of the one or more available actions or operations and to perform the operation by the remote payment system 700. In various embodiments, the required data and the UIDE may take on different contents and difference forms. They may be structured data block with well-defined fields with values or ranges. The required data can contain a variety of information include information to identify the user of the user device, the user device, the merchant, the clerk for the merchant, the POS of the merchant, the identification of the products, the physical location of the merchant, time of day, day of week, date, identification of remote payment application to be utilized, etc.

Once the transaction is requested by the user and the required data (RD) is acquired by the payment application 112, the required data (RD) is then provided 710 to a remote pay application 122, which may be local to the payment application 112 or it may be geographically dispersed and thus, the RD is transmitted across a network or some other communication channel or medium 710 to the remote pay application 122.

The remote pay application 122 receives and processes the required data from application 112 and may generate an actionable element or link 712, such as a unique clickable URL link and optionally a visual indicia (eg. an icon or a corresponding web browser viewable page). The remote pay application 122 then transmits 714 the data and actionable element 712 to a messaging application 152.

The messaging application 152 generates a message 716 containing data received from the remote pay application 122. The message that is generated by messaging application 152 can be constructed from a template or may simply include the data that was received from the remote pay application 122. The messaging application 152 determines what type of electronic messaging to use, such as short messaging service (SMS) or multimedia messaging service (MMS) as non-limiting examples. The messaging application 152 then transmits or provides 718 the message 716 and data, which at a minimum includes the actionable element 712, and may also contain the unique identification information of the originating user, the (UIDE) etc., to an SMS gateway server 170 (or some other messaging gateway server) that receives and forwards the electronic message to the appropriate destination.

The messaging gateway server 170 then transmits 720 the message 716 received from the messaging application 152 to the user, or user device 140 is associated with the initiation of the transaction. The correct user or user device 140 can be identified by examining the initial user identification information 702 obtained by the system 110. The transmission of the message is accomplished by transmitting the message through a carrier network 160 that can then forward the message to the user device 140.

The carrier network 160 then transmits 720 the message to a customer device 140. The carrier network 160 may the proprietary network infrastructure belonging to a telecommunication serve provider, such as a mobile telephone network, but may also incorporate other network infrastructure such as the PSTN etc. The message is received by a messaging application 142 that is running on the user device 140.

Once the message is received by the user device 140 and passed to a messaging application 142 residing on the user device 140, the user may receive notification on the user device 140. The user may then access the received message using the messaging application 142 on the user device 140. As described above, the message at least contains the actionable element 712. The message may be formatted as hypertext markup language (HTML), cascading style sheet (CSS), text, images, URL links, or a combination of two or more of these as well as well as other elements as non-limiting examples. At this point, the user can then complete the transaction by activating or actuating 722 the actionable element 712 in the message received on user device 140.

To complete the transaction, the user activates or actuates 722 the actionable element 712 in the message received by messaging application 142 on the user device 140. If the user actuates the actionable element 712 (such as clicking a link or URL) that is within the message, a web viewing application 144 may be opened or accessed on the user device 140. The web viewing application 144 may display a web viewable page provided from the remote pay application 122 or the machine/server that is running the remote pay application 122. It should be appreciated that user interfaces other than a web viewable page may also be utilized, such as a series of electronic messages exchanged between the user device 140 and messaging application 142, establishing a voice channel between the user device and the remote pay application 122 that provides electronic voice prompts and control, etc. In general, the remote pay application 122 in cooperation with the user device 140 presents 724 one or more payment options to the user. As non-limiting examples, the payment options may include credit card, online payment, ACH transfer from a banking account, etc.

The user may then select one of the one or more payment options 726. Depending on the payment option selected by the user 726, different payment processing mechanisms may be utilized. In general, the selection by the user initiates interfacing with or sending a signal or data 728 to a system or systems 750 that ultimately facilitates the transaction. Facilitating the transaction may involve approving the transaction, denying the transaction or reacting in a different manner, as well as extracting the funds and electronically transmitting them to the appropriate recipient. The transaction facilitating system 750, upon processing or facilitating the transaction, ultimately interfaces 730 with the remote pay application 122 to provide the processing result (i.e., approval, denial, etc) and the delivery of the required funds, if necessary, to the appropriate recipient.

Upon receiving the processing result from the transaction facilitating system 750, the remote pay application 122 provides 732 this result to payment application 112. Once the payment application 112 receives confirmation, the transaction is completed. For instance, if the user is a purchaser of a product at a POS in a store, then when the payment application 112 receives the results of the transaction facilitating system 750, the sale is either completed (if the payment is approved) or cancelled (if the payment is denied).

In one non-limiting example, the transaction facilitating system 750 may be a payment gateway server 180. In this embodiment, the user and the remote payment system 700 leverage a payment gateway server 180. If the user selects a payment option that relies on the services of a payment gateway server 180, the user device 140 and payment device 142 send the payment request to the payment gateway server 180. The payment gateway server 180 may operate by sending data to a payment processor 190. The payment processor 190 may then transmit data to the payment gateway server 180. The payment gateway server 180, upon receipt of the data, may then transmit the data to the remote payment application 122. Depending on the data received by the remote pay application 122, the web viewable page or other user interface on the customer device 140 may change or further information may be received on the customer device 140. The results are then provided to the payment application 112 to finalize the transaction.

As another non-limiting example a user may select an option which utilizes a digital wallet application 146 that may be installed on the customer device 140. If the user selects to use the digital wallet application 146 for the transaction, the digital wallet application 146 will be engaged on the customer device 140. Data is then transmitted from the digital wallet application 146 to the remote payment application 122. The remote payment application 122 responds by transmitting the data over the internet 130 to the payment processor 190. Upon approval of the payment, or denial of the payment, the payment processor 190 transmits data back to the remote pay application 122. Depending on the data received by remote pay application 122, the web viewable page on the customer device 140 may change or further information may be received on the customer device 140. The results are then provided to the payment application 112 to finalize the transaction. Further, the transaction facilitating system 750 may also provide 734 confirmation to the user device 140 that the transaction is complete. In addition or alternatively, the payment application 112 or the remote pay application 122 may also provide this confirmation to the user device 140.

It should be appreciated that a wide variety of payment options may be available in the various embodiments of the remote payment system 700. In addition to those mentioned, other non-limiting examples may include PAYPAL, VENMO, ZELLE, APPLE PAY, SAMSUNG PAY, DWOLLA, STRIPE, DUE, PAYONEER, 2CHECKOUT, AMAZON PAYMENTS, SQUARE, PAYZA, SKRILL, WEPAY, INTUIT GOPAYMENT, and AUTHORIZE.NET. In addition, the customer device may be equipped with various banking apps that may also enable payment options directly from the customers banking account. Even further, the user may enter other payment options such as entering credit card information, debit card information, gift card information, either on the key board or key pad or by scanning an insignia, such as a bar code or QR code on the card or associated with an account of the customer.

Figure 8:
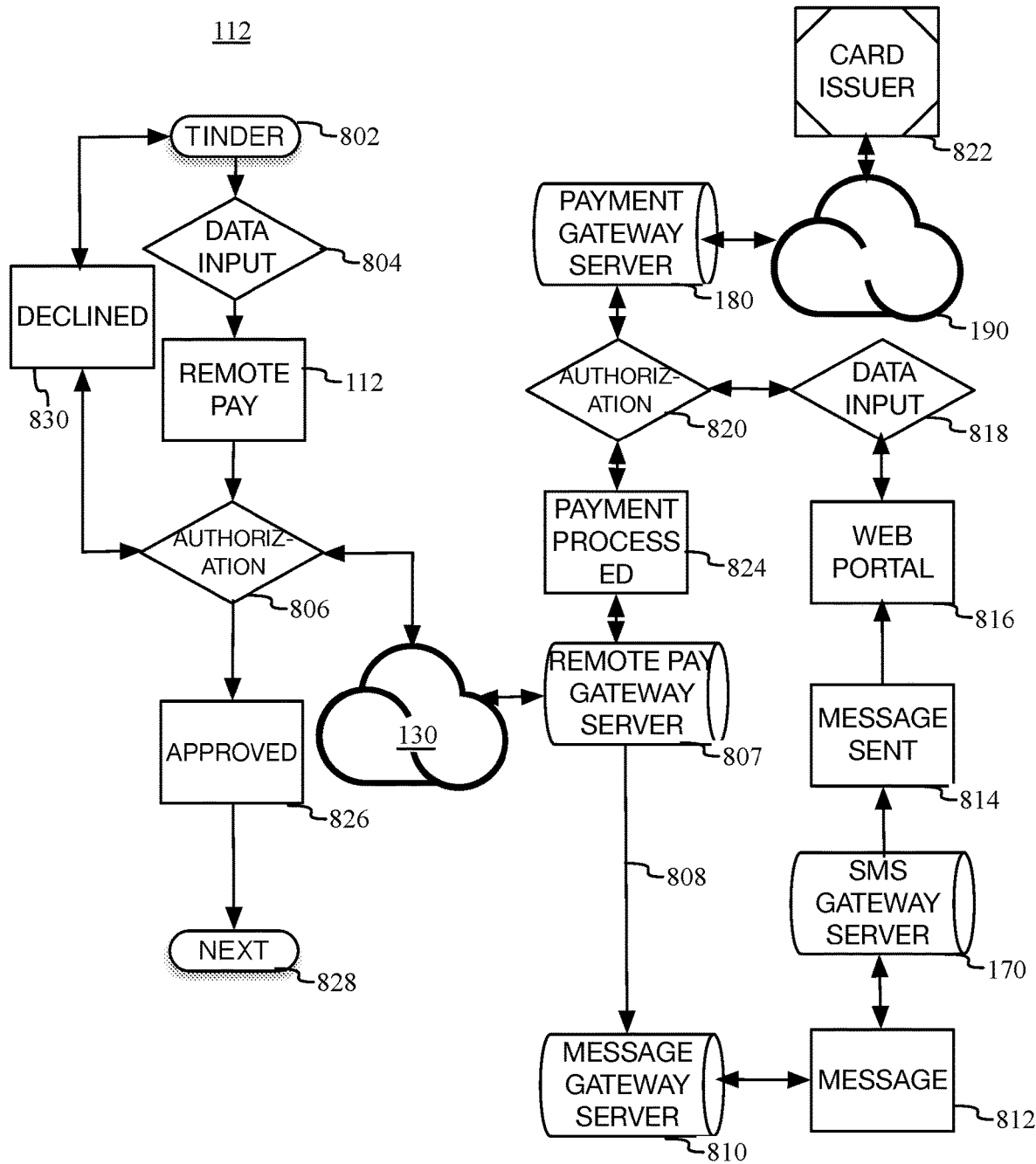
FIG. 8 is a flow diagram illustrating actions taken in another exemplary embodiment of the remote payment system.

FIG. 8 is a flow diagram illustrating actions taken in another exemplary embodiment of the remote payment system. The flow diagram in FIG. 8 presents more specific operations within a gateway environment. The flow diagram is presented in terms of actions occurring with the payment application 112 and then interfacing and processing the tender request through various components, systems, gateways, servers, etc. through the network 130.

Initially, a tinder process is initiated 802 through the payment application 112. The payment application requests further input from the user and obtains information from the database 114 or other source to generate the required data (RD) and to verify that the necessary information has been received 804. The RD is then passed to the remote pay application 122, which then interfaces to various gateway servers through the network 130 for the provision of authorization 806 for the transaction or tender.

Figure 9:
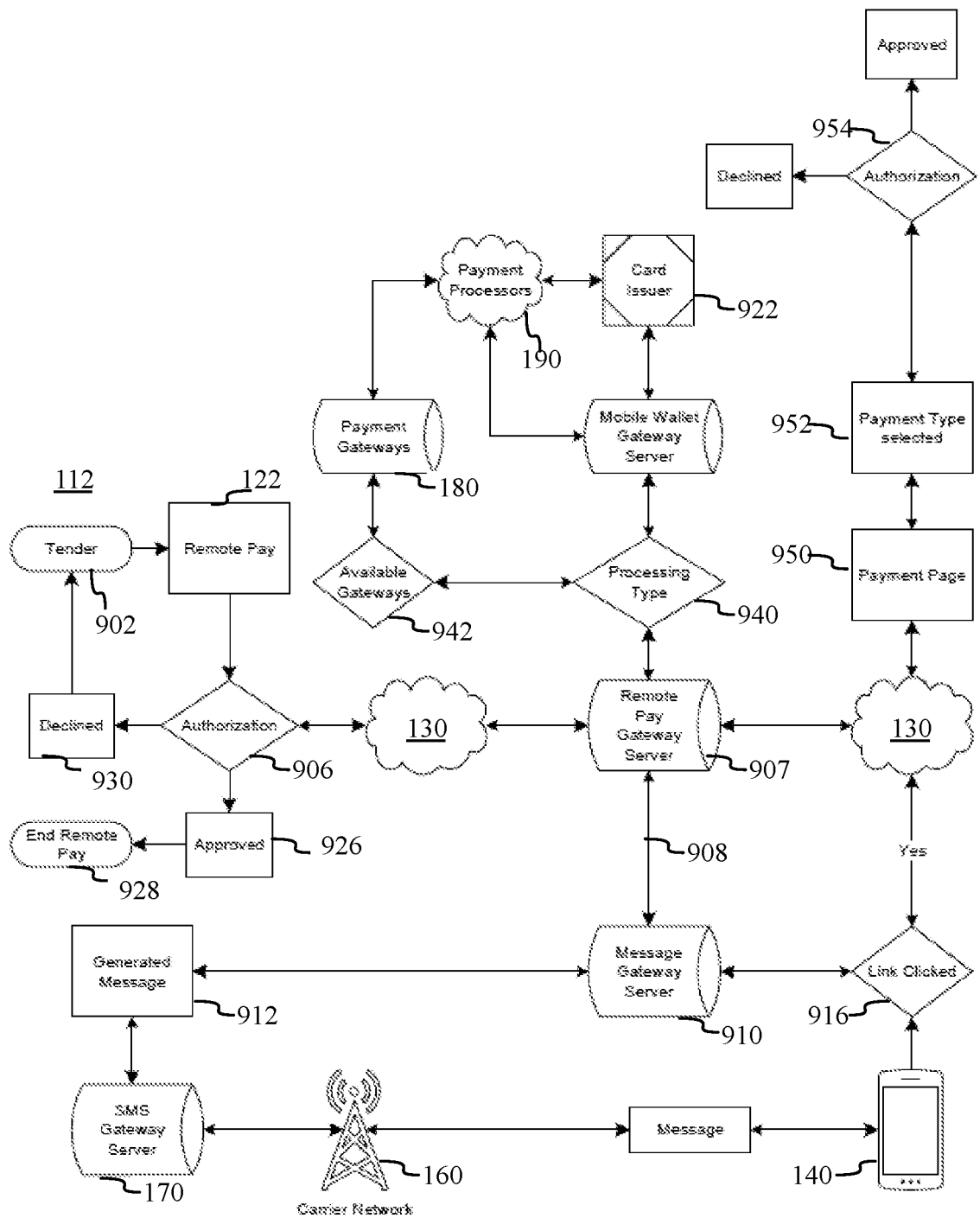
FIG. 9 is a flow diagram illustrating actions taken in another exemplary embodiment of the remote payment system.

The remote pay application 122 sends a request for authorization 806 through the network 130, which request is received by the remote pay gateway server 807. The remote pay gateway server 807 sends 808 the RD to the message gateway server 810. A message is generated 812 and then provided to the SMS gateway server 170 or other electronic message server. The message is then sent 814 over the appropriate communications network to a web portal 816 so that the web portal 816 can be configured to provide a user interface to a user. Accessing the web portal 816, the user actuate the actionable element 818 to gain access to the web portal 816. The user then interfaces with the web portal 816 to provide a selection, such as selecting the method for fulfilment of the tender. Once the user selection has been made, potentially including the authentication of the user, the selection is sent for authorization 820 to the appropriate payment processors 190 through the payment gateway server 180. The payment processors 190 interface with the funding institution, such as a bank or card issuer 822 to receive authorization for the transaction. The response for the tender request is then provided by the card issuer 822, back through the payment processors 190 and payment gateway 180 and once the payment is processed 824, authorization is passed to the remote pay gateway server 807. Authorization is passed through network 130 to the authorization decision block 806. If the tinder was authorized or approved 826, the transaction or tender is completed and processing may continue with the next tender 828 or wait until a next tender has been requested. If the tender was denied or declined or other exception occurred 830, the point-of-sale terminal is notified and the tinder can be cancelled or further actions may be requested. It should also be noted that transaction or tinder authorization or decline can also be communicated back to the web portal 816 to provide an indication of such to the user. FIG. 9 is a flow diagram illustrating actions taken in another exemplary embodiment of the remote payment system. The flow diagram in FIG. 9 presents more specific operations within a multiple gateway server environment. The flow diagram is presented in terms of actions initiated with the payment application 112 and then interfacing and processing the tender request through various components, systems, gateways, servers, etc. through the network 130.

Initially, a tinder process is initiated 902 through the payment application 112. The payment application 112 requests further input from the user and obtains information from the database 114 or other source to generate the required data (RD) and to verify that the necessary information has been received as illustrated in FIG. 8. The RD is then passed to the remote pay application 122, which then interfaces to various gateway servers through the network 130 for the provision of authorization 906 for the transaction or tender.

The remote pay application 122 sends a request for authorization 906 through the network 130, which request is received by the remote pay gateway server 907. The remote pay gateway server 907 sends 908 the RD to the message gateway server 910. A message is generated 912 and then provided to the SMS gateway server 170 or other electronic message server. An electronic message 914 in the appropriate format is then sent over the appropriate communications network 160 to a user device 140. The message 914, among other things, includes an actionable element. Utilizing the user device 140, the user can open the message and actuate the actionable element 916. Actuating the actionable element 916 can result in multiple actions. One action includes accessing the message gateway server 910 to notify the remote pay gateway server 907 that the user has actuated the actionable element 916 (i.e., a link or URL). The actuation of the actionable element 916 can provide an indication of the request to fulfill the tinder or transaction, which is then provided to the remote pay gateway server 907. The remote pay gateway server 907 then identifies the type of processing to be performed to fulfill the tinder. For one type, the fulfilment request can then be sent through available gateways 942 to the appropriate payment gateway servers 180 and payment processors 190.

The payment processors 190 interface with the funding institution, such as a bank or card issuer 922 to receive authorization for the transaction. The response for the tender request is then provided by the card issuer 922, back through the payment processors 190 and payment gateway 180 and once the payment is processed, authorization is passed to the remote pay gateway server 907. In addition, actuating the actionable element 916 may initiate a request through the network 130. It should be noted that while multiple elements are illustrated as being the network 130, the elements are actually one in the same in most embodiments. However, it should be appreciated that in other embodiments, a different network can be used for certain communication transmissions. For instance, the user device may access a computer server through a WIFI network rather than through the network 130. The user device 140 may then receive or access a payment page 950, select a payment type of fulfilment type, and receive 954 authorization approval or decline. Authorization is passed through network 130 to the authorization decision block 906. If the tinder was authorized or approved 926, the transaction or tender is completed and processing may continue with the next tender 928 or wait until a next tender has been requested. If the tender was denied or declined or some other exception occurred 930, the point-of-sale terminal is notified and the tinder can be cancelled or further actions may be requested.

Figure 10:
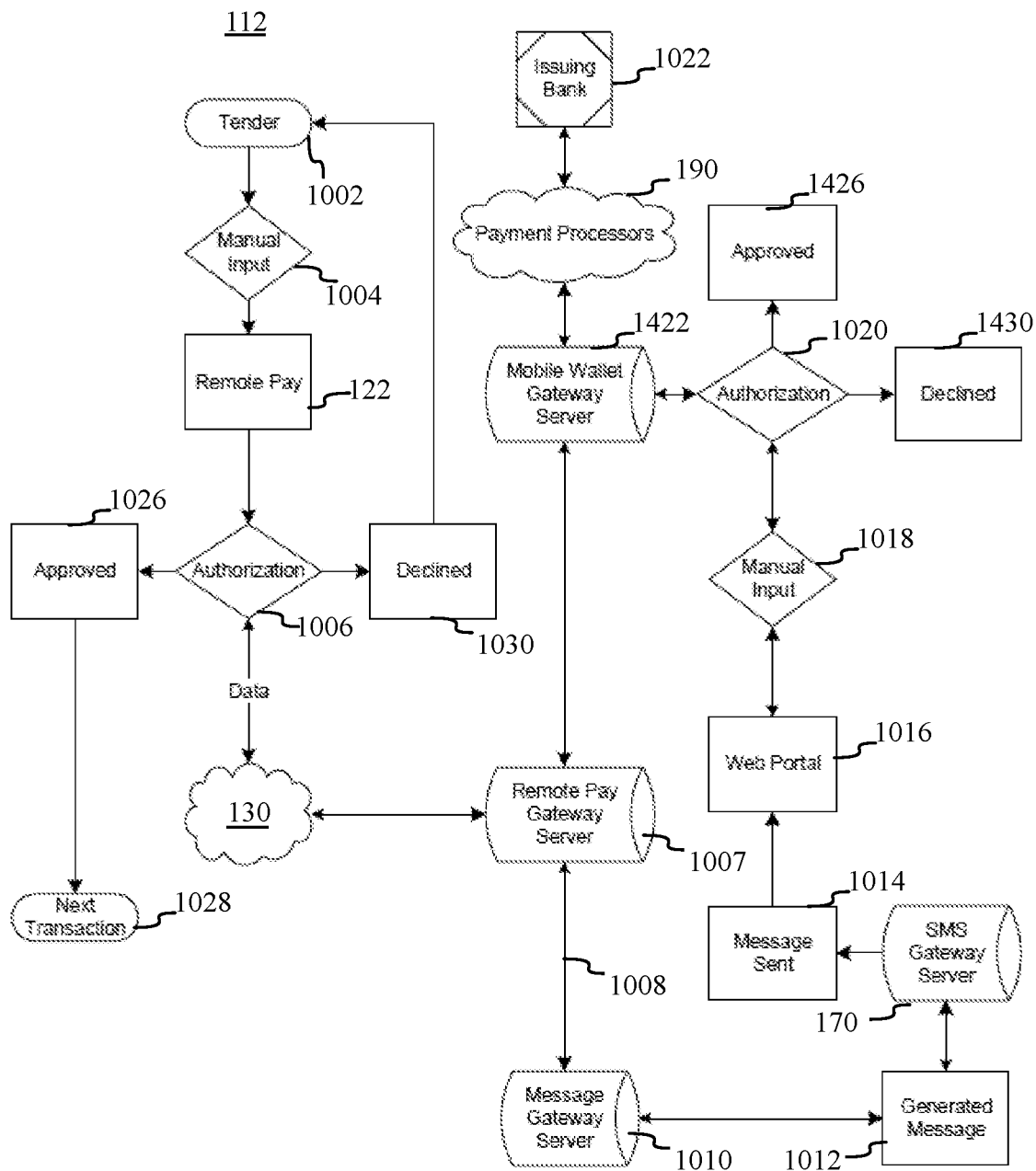
FIG. 10 is a flow diagram illustrating actions taken in yet another exemplary embodiment of the remote payment system.

FIG. 10 is a flow diagram illustrating actions taken in yet another exemplary embodiment of the remote payment system. The flow diagram in FIG. 10 presents more specific operations within an environment utilizing a digital wallet to fulfil a transaction. The flow diagram is presented in terms of actions initiated with the payment application 112 and then interfacing and processing the tender request through various components, systems, gateways, servers, etc. through the network 130.

Initially, a tinder process is initiated 1002 through the payment application 112. The payment application 112 requests further input 1004 from the user and obtains information from the database 114 or other source to generate the required data (RD) and to verify that the necessary information has been received similar to the process described in connection with FIG. 8. The RD is then passed to the remote pay application 122, which then interfaces to various gateway servers through the network 130 for the provision of authorization 1006 for the transaction or tender.

The remote pay application 122 sends a request for authorization 1006 through the network 130, which request is received by the remote pay gateway server 1007. The remote pay gateway server 1007 sends 1008 the RD to the message gateway server 1010. A message is generated 1012 and then provided to the SMS gateway server 170 or other electronic message server where a message is constructed. The message is then sent 1014 over the appropriate communications network to a web portal 1016 so that the web portal 1016 can be configured to provide a user interface to a user. Accessing the web portal 1016, the user then interfaces 1018 with the web portal 1016 to provide a selection, such as selecting the method for fulfilment of the tender. Once the user selection has been made, potentially including the authentication of the user, the selection is sent for authorization 1020. If the user opted to fulfill the tinder utilizing the user's mobile wallet, the authorization request is sent to the mobile wallet gateway 1422 to be handled by the appropriate payment processors 190. The payment processors 190 interface with the funding institution, such as a bank or card issuer 1022 to receive authorization for the transaction. The response for the tender request is then provided by the card issuer 1022, back through the payment processors 190 and mobile wallet gateway 1022 to the web portal 1016 and the remote pay gateway server 1007. Authorization is passed through network 130 to the authorization decision block 806.

If the tinder was authorized or approved 1026, the transaction or tender is completed and processing may continue with the next tender 1028 or wait until a next tender has been requested. If the tender was denied or declined or some other exception occurred 1030, the point-of-sale terminal is notified and the tinder can be cancelled or further actions may be requested. In addition, an approval 1426 or declined notice 1430 can be provided to the web portal 1016 to notify the user of the status.

Figure 11:
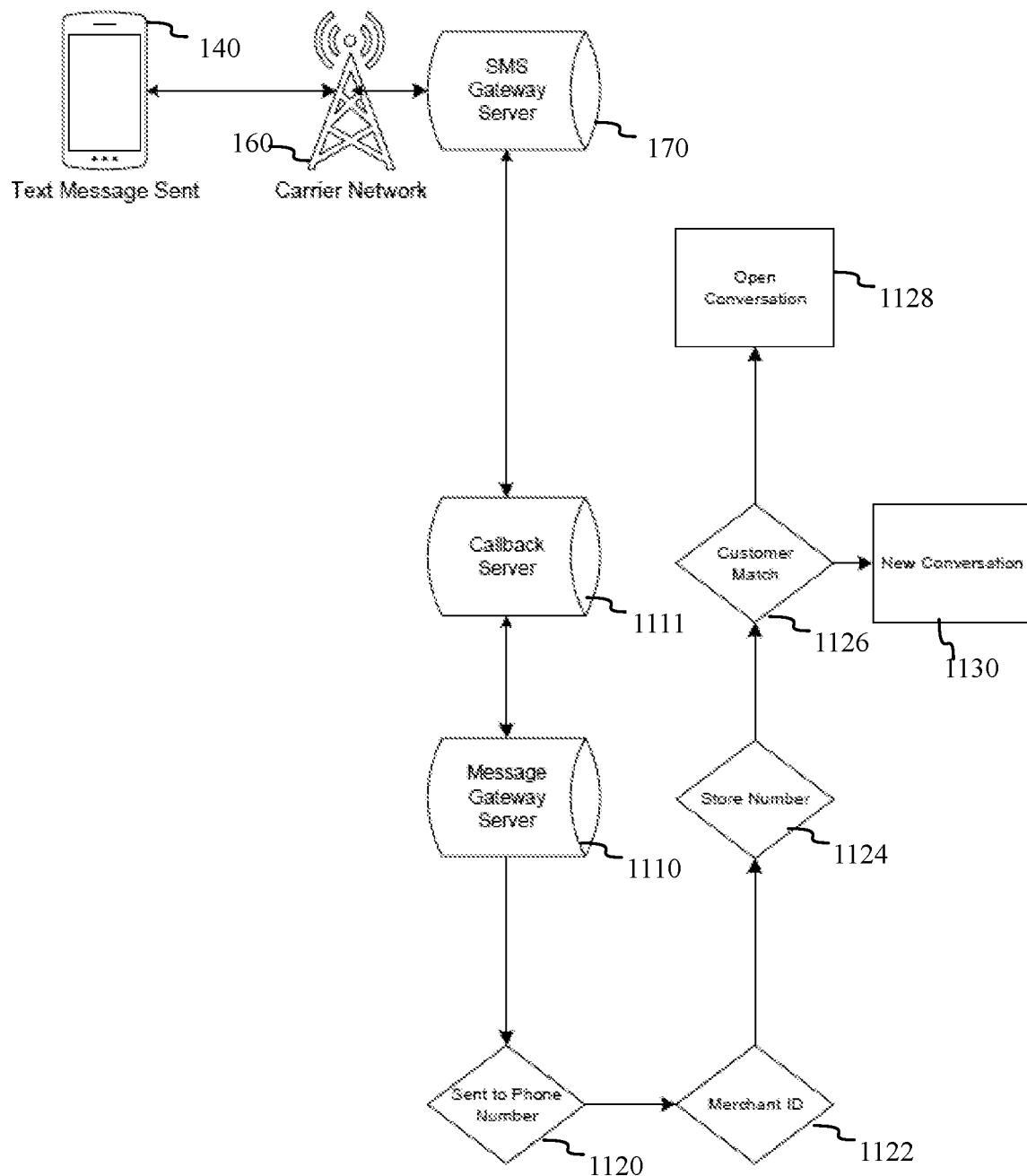
FIG. 11 is flow diagram showing exemplary processes for handling an incoming message by a user device such as illustrated in FIG. 9.

FIG. 11 is flow diagram showing exemplary processes for handling an incoming message by a user device such as illustrated in FIG. 9. Initially, a message can be generated by the message gateway server 1110 and transmitted through callback server 1110 to the SMS gateway server 170. The SMS gateway server 170 formats the message and transmits it to the user device 140 over the appropriate carrier network 160. The message may include an actionable element. Once the user actuates the actionable element using the user device 140, the information associated with the particular action is transmitted over the carrier network 160 back to the SMS gateway 170. The SMS gateway 170 then passes the message through the callback server 1111 to the message gateway server 1110.

The message gateway server 1110 then gathers information such as the sent to phone number 1120 that the original message was sent to, the merchant ID 1122 that is associated with the tinder or transaction that is being requested, and the store number or other identification information associated with transaction 1124. This information is then examined 1126 to determine if this communication matches with a previous customer in a currently active transaction 1126. If a match is found, then the message is identified as being part of an open conversation or transaction 1128 and the message can be processed accordingly. If a match is not found, then the message is identified as triggering a new conversation or transaction 1130.

In some embodiments, the remote payment system can be set up to completely eliminate, or at least greatly reduce user contact with any merchant equipment. For instance, in one embodiment, the user device can display an indicia, such as a QR code, bar code, etc. or transmit an audible or inaudible signal (such as wifi, Bluetooth, etc.). The terminal can also be set up to be in listen mode, or periodically enter listening mode or be triggered by some other event to enter listening mode, such as an electronic eye that detects motion, a sensor to detect the present of a user, video camera to detect a user is at the terminal, or when a user scans an item to purchase, etc. Certainly, the terminal could also include a soft-button or hard button that the user could push, but advantageously, a touchless mechanism could be employed. For instance, the user could simply pull up the display of the indicia and then scan it in front of the terminal. In response, the terminal may launch the payment program 112 and begin the process as presented above. Alternatively, the user device may include an app that the user can exercise to send a signal to wake up the terminal and place it into a mode in which the payment program 112 is running and the user has access to the remote payment system.

As such, a portion of the payment program 112 may reside on the user device or the user device may directly communicate with the payment program 112 in order to request the initiation of the transaction. Of course then, the user device would also be used to receive the message to further process the facilitation of the transaction as described above.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A network based method for authorizing the fulfillment of a transaction, the method comprising:

receiving a transaction initiation that is triggered as the result of a user interface of a computer program associated with a particular merchant being actuated by a particular entity, wherein the transaction includes a remote pay request;

obtaining transaction processing data from an information source, the transaction processing data uniquely identifying the particular entity that actuated the user interface, the particular merchant and one or more parameters pertaining to the transaction;

a remote server receiving and utilizing the transaction processing data to formulate an electronic message, wherein the electronic message comprises an actionable element that is associated with the particular entity, the particular merchant and the transaction, the actionable element including a link that can be selected by a user to invoke an action;

the remote server providing the electronic message to a communication device that is associated with the particular entity but that is not associated with the particular merchant or involved in the transaction;

detecting an actuation of the actionable element within the electronic message;

in response to detecting the actuation of the actionable element, providing further information to the communication device to identify the particular merchant, the transaction and options for fulfillment of the transaction, wherein the options include payment with a digital wallet, payment using one or more commercial payment processing systems and payment utilizing a payment gateway server;

receiving an option selection from the particular entity utilizing the communication device;

transmitting the option selection over a network to a fulfillment system;

receiving an approval for the fulfillment of the transaction from the fulfillment system; and providing an indication to the communication device and the computer program associated with the particular merchant that the approval for the fulfillment of the transaction has been received; whereby a user can initiate a transaction on any merchant device and complete the transaction on any personal computing devices of the user without having to provide personal credentials to the merchant device.

2. The network based method of claim 1, wherein the computer program associated with a particular merchant resides within a point-of-sale system and receiving a transaction initiation further comprises receiving a purchase initiation.

3. The network based method of claim 2, wherein obtaining transaction processing data from an information source comprises receiving information to identify the particular entity from the entity and receiving information to identify the particular merchant and one or more parameters pertaining to the transaction from a datastore communicatively coupled to the point-of-sale system.

4. The network based method of claim 3, wherein the communication device associated with the particular entity is a mobile device provisioned with a network telephone number and providing the electronic message to the communication device comprises sending the electronic message through a communications network directed to the network telephone number.

5. The network based method of claim 4, wherein detecting the actuation of the actionable element comprises receiving a response electronic message from the communication device transmitted in response to the entity actuating the actionable element.

6. The network based method of claim 5, wherein providing further information to the communication device comprises providing one or more payment options.

7. The network based method of claim 6, wherein receiving an option selection from the particular entity comprises receiving an electronic message that identifies a selected payment option and information necessary to perform the selected payment option.

8. The network based method of claim 7, wherein transmitting the option selection over a network to a fulfillment system comprises sending a payment request to the fulfillment system, the payment request including a dollar amount, the identity of the particular merchant and payment authorization information.

9. The network based method of claim 8, wherein the fulfillment system accesses an account associated with the particular entity to extract funds in the dollar amount and provide the extracted funds to an account associated with the particular merchant.

10. The network based method of claim 9, further comprising the computer application providing a visual indication on the point-of-sale system that the purchase has been fulfilled.

11. A network based system for authorizing the fulfillment of a transaction that is initiated on a merchant device such that it is completed utilizing a user communication device, the system comprising:
a computer program running on a merchant device that is associated with a particular merchant entity;
a communication device associated with a particular consumer entity;
a fulfillment system;
a transaction processing system, wherein the transaction processing system is configured to interface to the merchant device, the computer program running on the merchant device, the communication device and the fulfillment system over one or more networks, the transaction processing system including a transaction program in a non-transitory medium and a processor, and in response to the processor executing the transaction program, the transaction processing system operates to:
receive a transaction initiation as the result of the computer program being actuated by the particular entity, wherein the transaction initiation includes a remote pay request;
obtain transaction processing data from an information source, the transaction processing data uniquely identifying the particular consumer entity, the particular merchant entity and one or more parameters pertaining to the transaction;
utilize the transaction processing data to formulate an electronic message, wherein the electronic message comprises an actionable element that is associated with the particular merchant entity and the transaction, the actionable element including a link that can be selected by a user the particular consumer entity to further the fulfillment of the transaction;
provide the electronic message to the communication device associated with the particular consumer entity;
detect an actuation of the actionable element within the electronic message, the actuation being performed by the particular consumer entity;
in response to detecting the actuation of the actionable element, provide further information to the communication device to identify the particular merchant, the transaction and options for fulfillment of the transaction, wherein the options include payment with a digital wallet, payment using one or more commercial payment processing systems and payment utilizing a payment gateway server;
receive an option selection from the particular entity utilizing the communication device;
transmit the option selection over a network to the fulfillment system;
receive over the network, an approval of the fulfillment of the transaction from the fulfillment system; and
provide an indication to the communication device and the computer program associated that the approval for the fulfillment of the transaction has been received.

12. The network based system of claim 11, wherein the merchant device is a point-of-sale system and transaction is a purchase.

13. The network based system of claim 12, wherein the information source comprises the communication device and a datastore communicatively coupled to the merchant device and the computer program is configured to receive information to identify the particular entity from the communication device and to receive information to identify the particular merchant and one or more parameters pertaining to the transaction from the datastore and provide the information to the transaction processing system.

14. The network based system of claim 13, wherein the communication device associated with the particular entity is a mobile device provisioned with a network telephone number and the transaction processing system is configured to provide the electronic message to the communication device by sending the electronic message through a communications network directed to the network telephone number.

15. The network based system of claim 14, wherein the transaction processing system is configured to detect the actuation of the actionable element by receiving a response electronic message from the communication device transmitted in response to the entity actuating the actionable element.

16. The network based system of claim 15, wherein the transaction processing system is configure to provide further information to the communication device by providing one or more payment options.

17. The network based system of claim 16, wherein the transaction processing system is configured to receive an option selection from the particular entity by receiving an electronic message that identifies a selected payment option and information necessary to perform the selected payment option.

18. The network based system of claim 17, wherein the transaction processing system is configured to transmit the option selection over a network to a fulfillment system by sending a payment request to the fulfillment system, the payment request including a dollar amount, the identity of the particular merchant and payment authorization information.

19. The network based system of claim 18, wherein the fulfillment system is configured to access an account associated with the particular entity to extract funds in the dollar amount and provide the extracted funds to an account associated with the particular merchant.

20. The network based system of claim 19, wherein the computer application is configured to provide a visual indication on the point-of-sale system that the purchase has been fulfilled.

\* \* \* \* \*